United States Patent [19]
Halm et al.

[11] Patent Number: 5,160,720
[45] Date of Patent: Nov. 3, 1992

[54] METAL CATALYZED PRODUCTION OF TETRACHLOROSILANE

[75] Inventors: Roland L. Halm, Madison, Ind.; Regie H. Zapp, Carrollton, Ky.

[73] Assignee: Dow Corning Corporation, Midland, Mich.

[21] Appl. No.: 627,803

[22] Filed: Dec. 12, 1990

[51] Int. Cl.$^5$ ............................................ C01B 33/107
[52] U.S. Cl. .................................... 423/342; 423/347; 502/337; 502/339
[58] Field of Search ................ 423/342, 347; 502/262, 502/337, 339, 412, 413

[56] References Cited

U.S. PATENT DOCUMENTS

| | | | |
|---|---|---|---|
| 2,865,706 | 12/1958 | Fitch et al. | 423/342 |
| 3,133,109 | 5/1964 | Dotson | 423/342 |
| 4,044,109 | 8/1977 | Kotzsch et al. | 423/342 |
| 4,585,643 | 4/1986 | Barker | 423/342 |

FOREIGN PATENT DOCUMENTS

| | | | |
|---|---|---|---|
| 0107432 | 5/1984 | European Pat. Off. | 423/342 |
| 945618 | 1/1964 | United Kingdom . | |
| 1530986 | 11/1978 | United Kingdom . | |

Primary Examiner—Olik Chaudhuri
Assistant Examiner—Ken Horton
Attorney, Agent, or Firm—William F. Boley

[57] ABSTRACT

The present invention is a process for the production of silanes from the contact of hydrogen chloride with silicon. The silicon may be in the form of silicon metal or a silicon containing material. The described process employs a catalyst which increases the yield of tetrachlorosilane. The catalyst is selected from a group consisting of tin and tin compounds, nickel and nickel compounds, arsenic and arsenic compounds, palladium and palladium compounds, and mixtures thereof. The process is run at a temperature of about 250° C. to 500° C.

12 Claims, No Drawings

METAL CATALYZED PRODUCTION OF TETRACHLOROSILANE

BACKGROUND OF INVENTION

The present invention is a process for the production of silanes from the reaction of hydrogen chloride with silicon. The silicon may be in the form of silicon metal or a silicon containing material. The process employs a catalyst, selected from a group of metal and metal compounds, which increases production of tetrachlorosilane.

Much of the prior art is concerned with optimizing the reaction of hydrogen chloride with elemental silicon to form trichlorosilane and minimize production of other silanes, such as tetrachlorosilane. However, tetrachlorosilane is finding increasing industrial uses and, therefore, it is desirable to develop economical means for increasing tetrachlorosilane production from the reaction of hydrogen chloride and silicon metal or a silicon containing material.

British Patent No. 945,618, Published Jan. 2, 1964, describes a process for reacting metallic silicon with gaseous hydrogen chloride in the presence of a copper or copper-containing catalyst. The process is run at a temperature of 170° C. to 350° C. The process is reported to yield about 90% trichlorosilane with less than about 5% tetrachlorosilane being formed.

British Patent No. 1,530,986, Published Nov. 1, 1978, describes a method for the preparation of trichlorosilane and tetrachlorosilane by reaction of silicon or silicon-containing materials with hydrogen chloride in a fluidized bed at temperatures of from 250° C to 500° C. The reaction is carried out in the presence of from 0.2 to 10 parts by volume of gaseous silicon tetrachloride per part by volume of hydrogen chloride. Gaseous silicon tetrachloride is fed to the reactor both as a diluent for the gaseous hydrogen chloride and to maintain the homogeneity of the fluid bed.

None of the cited art teaches a process for the production of silanes which employs a catalyst effective in increasing the production of tetrachlorosilane from the reaction of hydrogen chloride with silicon.

SUMMARY OF THE INVENTION

The present invention is a process for the production of silanes from the contact of hydrogen chloride with silicon. The silicon may be in the form of silicon metal or a silicon containing material. The described process employs a catalyst which increases the yield of tetrachlorosilane. The catalyst is selected from a group consisting of tin and tin compounds, nickel and nickel compounds, arsenic and arsenic compounds, palladium and palladium compounds, and mixtures thereof. The process is run at a temperature of about 250° C. to 500° C.

DESCRIPTION OF THE INVENTION

The present invention is a catalyzed process for preparing silanes of formula $H_nSiCl_{4-n}$, where n is an integer from zero to four. The described process is especially useful for the production of tetrachlorosilane. The process comprises contacting silicon with hydrogen chloride in the presence of an effective concentration of a catalyst selected from a group consisting of tin and tin compounds, nickel and nickel compounds, arsenic and arsenic compounds, palladium and palladium compounds, and mixtures thereof: at a temperature of about 250° C. to 500° C.

The described process can be used to prepare silane ($SiH_4$), chlorosilane, dichlorosilane, trichlorosilane, and tetrachlorosilane. However, the catalysts described herein preferentially select for the production of tetrachlorosilane. Therefore, tetrachlorosilane is a preferred product of the process.

The silicon can be in the form of silicon metal or a silicon containing material. The term "silicon metal" refers to a metalloid type material consisting essentially of elemental silicon. The term "silicon containing material" refers to alloys or intermetallic compounds of elemental silicon with, for example, iron copper, or carbon. Preferred are alloys and intermetallic compounds comprising greater than about 50 percent by weight of elemental silicon. The silicon is contacted with hydrogen chloride in the presence of an effective concentration of a catalyst. The surface area of the silicon is important in determining the rate of reaction of silicon with hydrogen chloride. Therefore, the silicon should be finely divided or powdered. The silicon can be, for example, ground or atomized silicon. It is preferred that the particle size of the silicon be less than 100 mesh. Larger particle sizes of silicon may be used, but the conversion rate to product silanes may be reduced. The lower limit of the silicon particle size is determined by the ability to produce and handle the silicon.

The described process employs an effective concentration of a catalyst. By "effective concentration," it is meant a concentration of catalyst which increases the yield of the process for the production of tetrachlorosilane over the yield obtained in the absence of a catalyst. Preferred are those catalyst which increase the yield of tetrachlorosilane by at least 10 percent over yields obtained in the uncatalyzed process. The term "yield" refers to the absolute amount of tetrachlorosilane produced. Useful catalysts, for the described process, are selected from the group consisting of tin and tin compounds, nickel and nickel compounds, arsenic and arsenic compounds, palladium and palladium compounds, and mixtures thereof. When the catalyst is selected from a group consisting of tin and tin compounds, nickel and nickel compounds, and arsenic and arsenic compounds an effective catalyst concentration is about 250 to 4,000 parts per million (ppm) of combined silicon and catalyst. Higher catalyst concentrations may be used, but to no perceived advantage. When the catalyst is selected from a group consisting of palladium and palladium compounds an effective catalyst concentration is about 600 to 4000 ppm of combined silicon and catalyst. All catalyst concentrations are expressed as the concentration of catalytic metal contacted with the silicon.

The metal catalyst compounds can be organic or inorganic compounds. Preferred are inorganic metal catalyst compounds. The inorganic metal catalyst compounds can be, for example, halide or oxide compounds of tin, nickel, arsenic, or palladium. The inorganic compounds can be, for example, $NiBr_2$, $NiCl_2$, $AsBr_3$, $As_2O_5$, $SnCl_4$, $SnO_2$, $PdBr_2$, $PdCl_2$, or $PdO$. The preferred catalysts are tin and tin compounds. The most preferred catalyst is tin metal.

For the catalyst to be effective in the described process, the catalyst must have high interfacial contact with the silicon. Standard methods for establishing contact between reactants and a catalyst may be employed for this purpose. The catalyst may be, for example, in the form of a powder which is mechanically mixed with the silicon. The catalyst may be, for example, an alloy with the silicon.

Contact of the silicon and catalyst mixture with hydrogen chloride may be effected in standard type reactors for contacting solid and gaseous reactants. The reactor may be, for example, a fixed-bed reactor, a stirred-bed reactor, or a fluidized-bed reactor. It is preferred that the reactor, containing the silicon and catalyst mixture, be purged with an inert gas, such as nitrogen or argon, prior to introduction of the hydrogen chloride. This purging is to remove oxygen and prevent oxidation of silicon and formation of other detrimental oxygenates.

The required contact time for the hydrogen chloride to react with the silicon will depend upon such factors as the temperature at which the reaction is run and the type and concentration of catalyst employed. In general contact times in the range of 0.1 to 100 seconds have been found useful.

The described process can be run at a temperature of about 250° C. to 500° C. However, a preferred temperature for running the process is about 270° C. to 400° C.

Recovery of the product silanes can be by standard means, for example, by condensation.

So that those skilled in the art may better understand the described invention, the following examples are offered for illustration. These examples are not intended to be limiting on the process described herein.

Examples. The ability of selected metal and metal compounds to catalyze the reaction of hydrogen chloride with silicon to form tetrachlorosilane was evaluated in a series of test runs. The process was conducted in a fluidized-bed reactor of conventional design, similar to that described by Dotson U.S. Pat. No. 3,133,109, issued May 12, 1964. For each test run, a mixture of ground metallurgical grade silicon metal (Elkem Metals Company. Alloy. W. Va.) and the potential catalytic material was formed. The test mixture was added to the reactor and the reactor was purged with nitrogen gas for about 30 minutes. The reactor temperature, for each run, was maintained at the temperature specified in Table 1. Hydrogen Chloride was fed to the reactor a rate of 8-10 g/h for a period of about 20 hours. Products were collected continuously throughout the 20-hour run, in a cold trap. The collected product was analyzed by gas liquid chromatography to determine the amounts and types of silanes produced. The weight difference of the reactor before and after each run was used as an indication of silicon conversion.

Materials tested as catalysts and their concentrations in the ground silicon metal are listed in Table 1. The sources of materials tested as catalysts, as indicated in Table 1, are: Aldrich Chemical Company, Milwaukee, Wis.; ALFA Research Chemicals Danvers, Mass.; and Belmont Metals. Inc., Brooklyn, N.Y. Unless indicated otherwise, under the heading "Type." all materials were tested as powders in the form received. Screened particle size of the tested material is provided in parenthesis, when screening was conducted.

The results of this series of runs are presented in Table 1 under the heading "Product." Under the subheadings "HSiCl$_4$" and "SiCl$_4$" are listed the weight percent of these two products in relation to total recovered products. Under the heading "Si-Conv" is presented the percent of silicon metal consumed during the process as determined by the reduction in weight of silicon initially added to the reactor. The heading "P.I." is a performance index calculated as the "SiCl$_4$" value multiplied by the "Si-Conv"/100 value. The first line of data represents a baseline for a process in which no catalyst was present. The values presented for the baseline are the averaged values of four separated runs. All other values in Table 1 are the averaged values for two separate runs.

TABLE 1

Effect of Metal and Metal Compounds as Catalyst For Tetrachlorosilane Production

| Catalyst | | | Temp. | Product | | | |
|---|---|---|---|---|---|---|---|
| Type | Source | Conc.* (ppm) | (°C.) | HSiCl$_3$ | SiCl$_4$ | Si-Conv | P.I. |
| None | — | — | 315 | 87.1 | 12.0 | 93.0 | 11 |
| Sn | Belmont | 250 | 315 | 67.7 | 26.2 | 96.0 | 25 |
| Sn | Belmont | 500 | 315 | 62.7 | 35.9 | 91.1 | 33 |
| Sn | Belmont | 1000 | 315 | 62.6 | 35.7 | 95.3 | 34 |
| Sn | Belmont | 2000 | 315 | 49.4 | 50.2 | 91.1 | 46 |
| Sn | Belmont | 4000 | 315 | 58.8 | 41.1 | 95.8 | 39 |
| Sn | Belmont | 4000 | 350 | 55.2 | 41.5 | 87.4 | 36 |
| Sn(−325 mesh) | Aldrich | 500 | 315 | 66.3 | 30.3 | 84.6 | 26 |
| Sn(−100 mesh) | Aldrich | 1000 | 315 | 70.7 | 28.3 | 75.4 | 21 |
| Sn(IV)Cl | Aldrich | 1000 | 315 | 61.6 | 38.1 | 90.8 | 35 |
| SnCl$_4$.5H$_2$O | Alfa | 1000 | 315 | 48.2 | 51.1 | 66.0 | 34 |
| Sn(II) Oxide | Aldrich | 1000 | 315 | 66.6 | 32.4 | 83.2 | 27 |
| Sn(IV) Oxide | Aldrich | 1000 | 315 | 63.2 | 34.7 | 74.7 | 26 |
| Ni(2μ) | Aldrich | 2000 | 315 | 63.6 | 29.9 | 91.9 | 27 |
| Ni | Alfa | 4000 | 315 | 76.6 | 20.7 | 82.3 | 17 |
| As | Alfa | 500 | 315 | 73.8 | 25.4 | 93.9 | 24 |
| As | Alfa | 2000 | 315 | 78.1 | 20.2 | 86.3 | 17 |
| Pd | Aldrich | 500 | 315 | 86.9 | 11.9 | 93.2 | 11 |
| Pd | Aldrich | 1000 | 315 | 69.8 | 27.8 | 84.6 | 24 |
| Pd | Aldrich | 2000 | 315 | 73.1 | 25.8 | 90.6 | 23 |

*Concentrations are expressed as ppm of catalytic metal.

What is claimed is:

1. A process for preparing silanes of formula H$_n$SiCl$_{4-n}$, where n is an integer from 0 to 4, the process consisting essentially of: contacting silicon with hydrogen chloride in the presence of an effective concentration of a catalyst, which increases yield of tetrachlorosilane, selected from a group consisting of tin and tin compounds, nickel and nickel compounds, arsenic and arsenic compounds, palladium and palladium compounds, and mixtures thereof; at a temperature of about 250° C. to 500° C.

2. A process according to claim 1, where the temperature is 270° C. to 400° C.

3. A process according to claim 1, where the catalyst is selected from a group consisting of tin and tin compounds.

4. A process according to claim 1, where the catalyst is elemental tin.

5. A process according to claim 1, where the catalyst is selected from a group consisting of elemental tin, nickel, arsenic, and palladium.

6. A process according to claim 1, where the catalyst is selected from a group consisting of tin and tin compounds, nickel and nickel compounds, and arsenic and arsenic compounds and the concentration of the catalyst is about 250 to 4,000 ppm by weight based on silicon.

7. A process according to claim 6, where the catalyst is selected from the group consisting of elemental tin, nickel, and arsenic.

8. A process according to claim 1, where the catalyst is selected from a group consisting of palladium and palladium compounds and the concentration of the catalyst is about 600 to 4,000 ppm by weight based on silicon.

9. A process according to claim 8, where the catalyst is elemental palladium.

10. A process according to claim 1, where the silane is tetrachlorosilane.

11. A process according to claim 1, where the silane is tetrachlorosilane, the catalyst is elemental tin, and the temperature is about 270° C. to 400° C.

12. A process according to claim 1, where the silicon is silicon metal.

* * * * *